(12) United States Patent
Huang

(10) Patent No.: US 11,252,623 B2
(45) Date of Patent: Feb. 15, 2022

(54) NETWORK SWITCHING METHOD, DEVICE AND STORAGE MEDIUM

(71) Applicant: Beijing Xiaomi Mobile Software Co., Ltd., Beijing (CN)

(72) Inventor: Qianhong Huang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/927,481

(22) Filed: Jul. 13, 2020

(65) Prior Publication Data

US 2021/0250830 A1   Aug. 12, 2021

(30) Foreign Application Priority Data

Feb. 6, 2020   (CN) .......................... 202010081521.X

(51) Int. Cl.
  *H04W 36/14*   (2009.01)
  *H04L 29/06*   (2006.01)
  (Continued)

(52) U.S. Cl.
  CPC ......... *H04W 36/14* (2013.01); *H04L 65/1016* (2013.01); *H04W 36/0022* (2013.01);
  (Continued)

(58) Field of Classification Search
  CPC . H04W 36/14; H04W 36/0083; H04W 36/30; H04W 48/18; H04W 36/0022;
  (Continued)

(56) References Cited

U.S. PATENT DOCUMENTS

| 2010/0309847 A1* | 12/2010 | Bharadwaj | ............ | H04W 48/18 |
| | | | | 370/328 |
| 2013/0191536 A1* | 7/2013 | Noldus | ............... | H04L 65/1006 |
| | | | | 709/224 |

(Continued)

FOREIGN PATENT DOCUMENTS

| CN | 101668318 | 3/2010 |
| CN | 105282769 | 1/2016 |

(Continued)

OTHER PUBLICATIONS

Extended European Search Report dated Feb. 2, 2021 in corresponding European Patent Application No. 20189328.6, 11 pages
Office Action dated Oct. 8, 2021 in Chinese Patent Application No. 202010081521.X, with concise English translation.

*Primary Examiner* — Michael Y Mapa
(74) *Attorney, Agent, or Firm* — Oblon, McClelland, Maier & Neustadt, L.L.P.

(57) ABSTRACT

Aspects of the disclosure provide a network switching method, device, and storage medium. In an exemplary method, a terminal may determine whether a target wireless access network is capable of establishing a connection with an IP Multimedia Subsystem (IMS) network. If the target wireless access network is capable of establishing the connection with the IMS network, then a wireless access network corresponding to the terminal can be switched to the target wireless access network.

17 Claims, 11 Drawing Sheets

Determine whether a target wireless access network to be switched to is capable of establishing a connection with an IMS network — 101

If the target wireless access network is capable of establishing the connection with the IMS network, switch the wireless access network corresponding to the terminal to the target wireless access network — 102

(51) Int. Cl.
  *H04W 36/00* (2009.01)
  *H04W 36/30* (2009.01)
  *H04W 48/18* (2009.01)
  *H04W 52/02* (2009.01)

(52) U.S. Cl.
  CPC ....... *H04W 36/0083* (2013.01); *H04W 36/30* (2013.01); *H04W 48/18* (2013.01); *H04W 52/0245* (2013.01)

(58) Field of Classification Search
  CPC ....... H04W 52/0245; H04W 36/00835; H04W 36/0055; H04L 65/1016
  USPC .................................. 370/331; 455/436–445
  See application file for complete search history.

(56) References Cited

U.S. PATENT DOCUMENTS

| | | |
|---|---|---|
| 2017/0041771 A1* | 2/2017 | Lim .................. H04W 36/0022 |
| 2017/0094574 A1 | 3/2017 | Singh et al. |
| 2017/0180429 A1 | 6/2017 | Österlund et al. |
| 2018/0332428 A1* | 11/2018 | Gupta ................. H04L 61/1564 |
| 2021/0021646 A1* | 1/2021 | Chiang ................ H04W 76/12 |

FOREIGN PATENT DOCUMENTS

| | | |
|---|---|---|
| CN | 107484217 | 12/2017 |
| CN | 109041149 | 12/2018 |
| WO | WO 2016/004968 A1 | 1/2016 |
| WO | WO 2017/026978 A1 | 2/2017 |

* cited by examiner

NETWORK SWITCHING METHOD, DEVICE AND STORAGE MEDIUM

CROSS REFERENCE TO RELATED APPLICATIONS

The present application is based on and claims priority to Chinese patent application 202010081521X filed on Feb. 6, 2020, the entire content of which is incorporated herein by reference.

TECHNICAL FIELD

The present disclosure relates to the field of communications, and in particular, to a network switching method, device and storage medium.

BACKGROUND

Currently, Wireless-Fidelity (Wi-Fi) hotspots offer very limited coverages, and terminals often are switched between areas with and without Wi-Fi coverage. The way Long Term Evolution (LTE)/New Radio (NR) 5th generation mobile networks (5G) and other cellular mobile communication networks are actually deployed is complicated. When accessing an IP Multimedia Subsystem (IMS) network through a wireless access network, such as a Wi-Fi hotspot or LTE/NR 5G, a terminal often needs to switch between different Wi-Fi hotspots and different access technologies.

SUMMARY

According to a first aspect of the present disclosure, a network switching method is provided. The method is applicable to a terminal and can include determining whether a target wireless access network to be switched to is capable of establishing a connection with an IMS network, and, if the target wireless access network is capable of establishing the connection with the IMS network, switching a wireless access network corresponding to the terminal to the target wireless access network.

According to a second aspect of the present disclosure, a network switching device is provided. The device is applicable to a terminal and can include a first determining module that is configured to determine whether a target wireless access network to be switched to is capable of establishing a connection with an IMS network, and a network switching module that is configured to switch a wireless access network corresponding to the terminal to the target wireless access network if the target wireless access network is capable of establishing the connection with the IMS network.

According to a third aspect of the present disclosure, a computer-readable storage medium is provided, where the storage medium stores a computer program, and the computer program is used for executing any of the network switching methods described above in the first aspect.

According to a fourth aspect of the present disclosure, a network switching device is provided. The device is applicable to a terminal and can include a processor and storage medium on which instructions executable by the processor are stored. The processor can be configured to determine whether a target wireless access network to be switched to is capable of establishing a connection with an IMS network, and, if the target wireless access network is capable of establishing the connection with the IMS network, switch a wireless access network corresponding to the terminal to the target wireless access network.

It should be understood that the general description above and the detailed description below are only exemplary and explanatory, and are not to limit the present disclosure.

BRIEF DESCRIPTION OF THE DRAWINGS

The drawings herein are incorporated into and constitute part of the present specification, illustrate embodiments consistent with the present disclosure, and are used in combination with the specification to explain the principles of this disclosure.

DETAILED DESCRIPTION OF THE EMBODIMENTS

Figure 1:
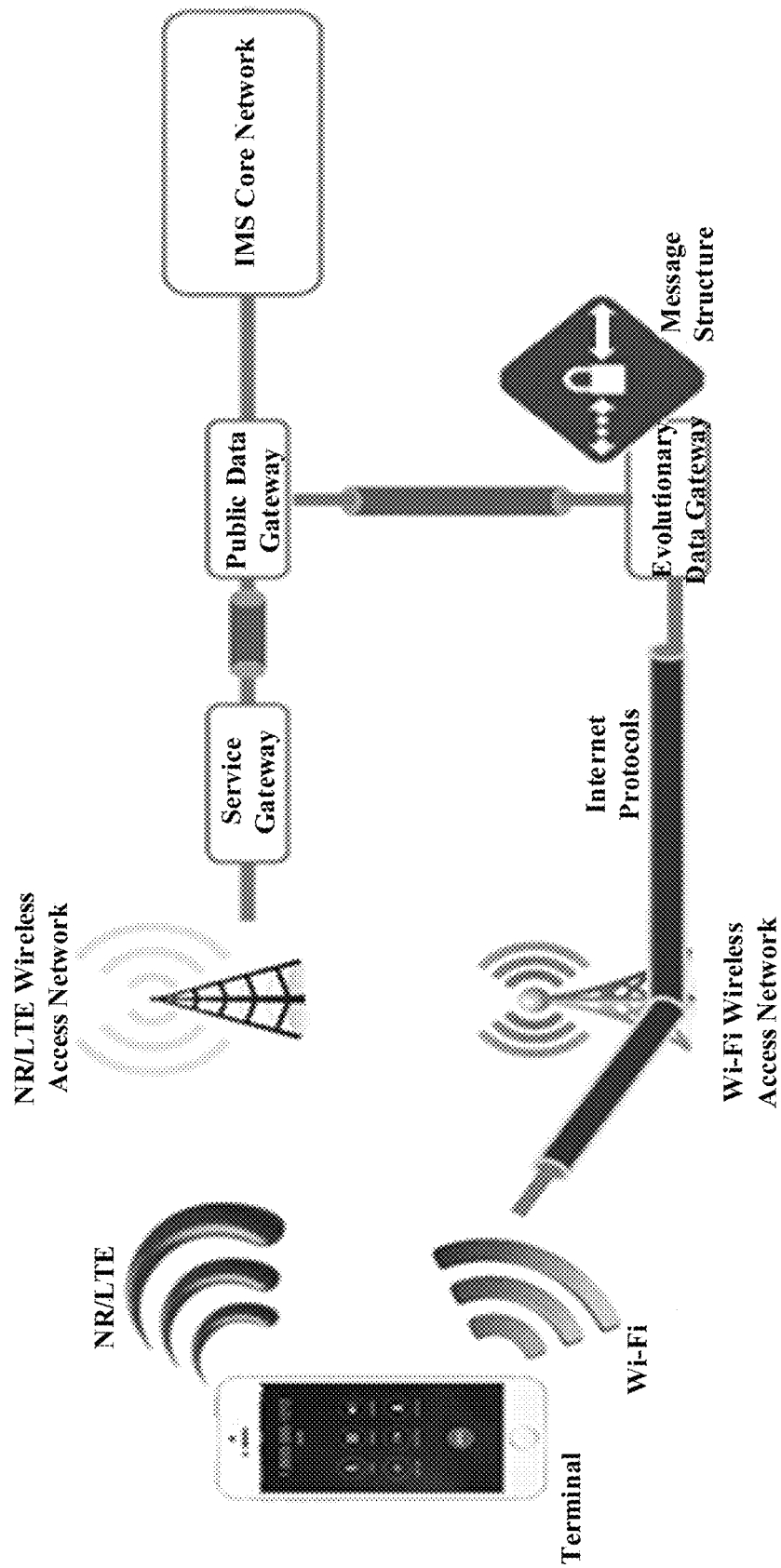
FIG. 1 is a schematic diagram of a scenario where a terminal accesses an IMS network according to an exemplary embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality or multiple, unless clearly indicated otherwise in the context. It should also be understood that the term "and/or" as used herein is and includes any and all possible combinations of one or more of the associated listed items.

It is to be understood that, although terms "first", "second", "third" and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

A terminal can access the IMS core network by utilizing Wi-Fi hotspots, as well as utilizing mobile communication networks such as LTE/NR 5G and the like, as shown in FIG. 1. Currently, Voice over Wireless-Fidelity (VoWiFi) service is also deployed. In VoWiFi, Wi-Fi is treated as a wireless access network, with a standard telephone software being utilized to dial or receive voice calls. The packet data of the terminal related to VoWiFi is tunneled to the IMS core network for two-way transmission. Therefore, VoWiFi seems to extend the IMS service indoors through Wi-Fi, and the terminal is allowed to switch to LTE/NR 5G when it moves outdoors, so that the LTE/NR 5G is capable of providing Voice over Long Term Evolution (VoLTE) service.

Generally, a wireless local area network provided by Wi-Fi can be generated and maintained by a wireless Access Point (AP). The terminal can switch its wireless access network from the LTE/NR 5G network provided by mobile base station A to the wireless local area network provided by Wi-Fi hotspot B when the wireless signal strength of mobile base station A is smaller and the wireless signal strength of Wi-Fi hotspot B is higher. However, if Wi-Fi hotspot B cannot communicate with the IMS network, the terminal cannot proceed the service provided by the IMS network after performing the switching between wireless access networks.

Figure 2:
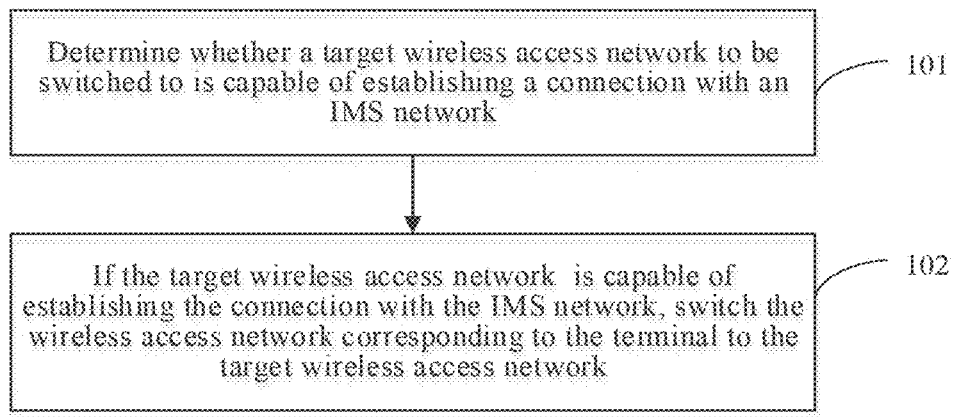
FIG. 2 is a flowchart of a network switching method according to an exemplary embodiment of the present disclosure.

In order to solve the above problems, the embodiments of the present disclosure provide a network switching method applicable to terminals, such as smart phones, tablet computers, personal digital assistants (PDAs), and the like. FIG. 2 illustrates a network switching method according to an exemplary embodiment. As shown in FIG. 2, the method includes the following steps.

At step 101, it is determined whether a target wireless access network to be switched to is capable of establishing a connection with an IMS network. In an embodiment of the present disclosure, the terminal may currently establish a connection with the IMS network through a wireless access network. The wireless access network currently connected to the terminal may be a wireless local area network or an LTE NR 5G network. The target wireless access network to be switched to may be of the same type as, or a different type from, the wireless access network currently connected to the terminal. Optionally, the target wireless access network may be a wireless local area network.

At step 102, if the target wireless access network is capable of establishing the connection with the IMS network, the wireless access network corresponding to the terminal is switched to the target wireless access network. In the above embodiment, in response to determining that the target wireless access network to be switched to is capable of establishing the connection with the IMS network, the terminal can switch the corresponding wireless access network to the target wireless access network. In this way, even switching to the target wireless access network, the terminal can continue to use the services of the IMS network with high usability.

Figure 3:
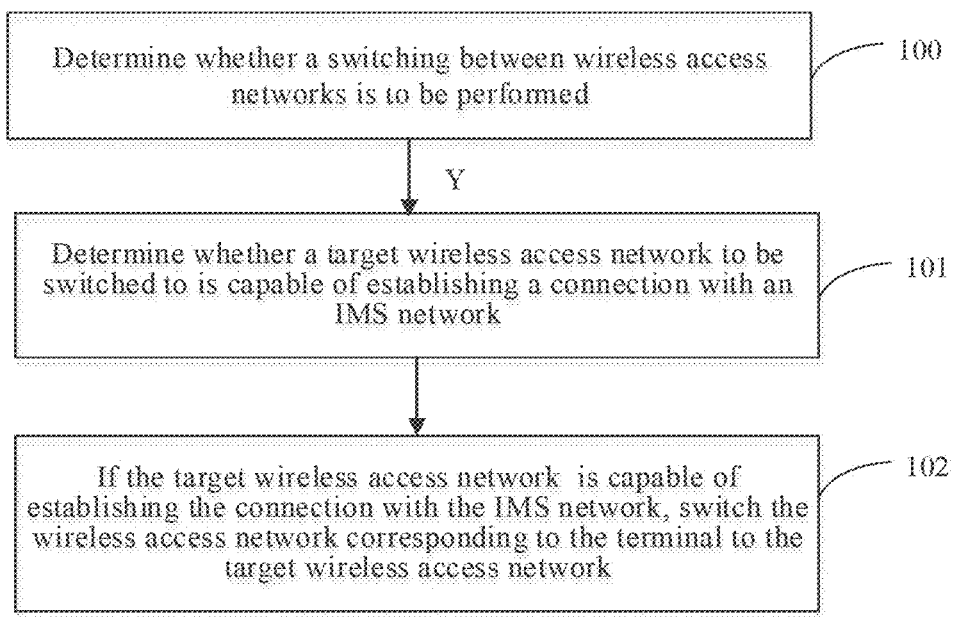
FIG. 3 is another flowchart of a network switching method according to an exemplary embodiment of the present disclosure.

FIG. 3 illustrates another network switching method on the basis of the foregoing method shown in FIG. 2. As shown in FIG. 3, in an optional embodiment, the method may further include the following step.

At step 100, it is determined whether a switching between wireless access networks is to be performed. In an embodiment of the present disclosure, step 101 may be performed by the terminal when determining that the switching between wireless access networks is to be performed, so to determine whether the target wireless access network is capable of establishing the connection with the IMS network.

Figure 4:
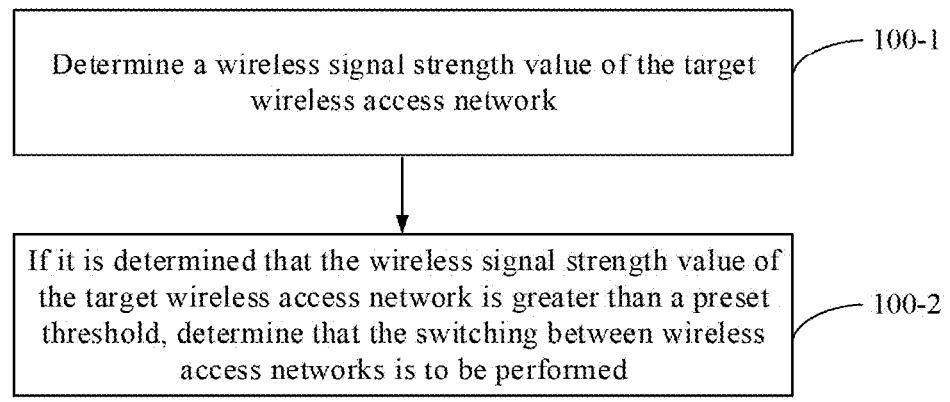
FIG. 4 is a flowchart of determining whether a switching between wireless access networks is to be performed according to an exemplary embodiment of the present disclosure.

FIG. 4 illustrates another network switching method on the basis of the foregoing method shown in FIG. 3. As shown in FIG. 4, in an optional embodiment, the method may further include the following steps.

At step 100-1, a wireless signal strength value of the target wireless access network is determined.

At step 100-2, if the wireless signal strength value of the target wireless access network is greater than a preset threshold, it is determined that the switching between wireless access networks is to be performed. In an embodiment of the present disclosure, if the wireless signal strength value of the target wireless access network is lesser than or equal to the preset threshold, it can be determined that the switching between wireless access networks is not expected.

In the case that the wireless signal strength value of the target wireless access network, which is obtained via a terminal test, exceeds the preset threshold, it indicates that the wireless signal that the target wireless access network can provide is strong, and the switching between wireless access networks can be performed.

In the above embodiment, for the terminal, in response to determining that the switching between wireless access networks is to be performed, it may determine whether the target wireless access network to be switched to is capable of establishing the connection with the IMS network. Optionally, the switching between wireless access networks may be determined as to be performed when the wireless signal strength value of the target wireless access network is greater than the preset threshold. In this way, both the wireless signal strength value of the target wireless access network and the connectivity between the target wireless access network and the IMS network are taken into consideration, with high usability.

Figure 5:
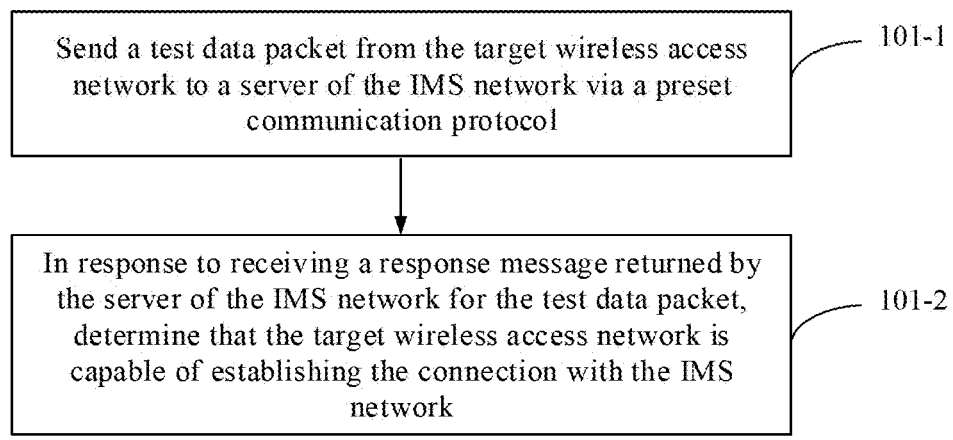
FIG. 5 is a flowchart of determining whether a target wireless access network to be switched to is capable of establishing a connection with an IMS network according to an exemplary embodiment of the present disclosure.

FIG. 5 illustrates another network switching method on the basis of the foregoing method shown in FIG. 2. As shown in FIG. 5, in an optional embodiment, step 101 may include the following steps.

At step 101-1, a test data packet is sent from the target wireless access network to a server of the IMS network via a preset communication protocol. In an embodiment of the present disclosure, the preset communication protocol may be Internet Control Message Protocol (ICMP) in Transmission Control Protocol/Internet Protocol (TCP/IP). The test data packet may be a data packet agreed upon with the IMS network in advance.

At step 101-2, in response to receiving a response message returned by the server of the IMS network for the test data packet, it is determined that the target wireless access network is capable of establishing the connection with the IMS network. In response to receiving the test data packet, the server of the IMS network can return a preset response message to the target wireless access network. In response to receiving the response message through the target wireless access network, the terminal can determine that the target wireless access network is capable of establishing the connection with the IMS network.

Among them, the response message may be a response message agreed upon in advance for confirming that the IMS network receives the test data packet, or at least part of the data content in the test data packet, which is not limited in the present disclosure.

In an embodiment of the present disclosure, if the terminal does not receive the response message within a preset duration after sending the test data packet, it may be considered that the target wireless access network is not capable of establishing the connection with the IMS network, and the switching between wireless access networks may not be performed, so as to avoid unavailability of services provided by the IMS network after the switching.

In the above embodiment, the terminal may send the test data packet from the target wireless access network to the server of the IMS network via the preset communication protocol. In response to receiving the response message returned by the server of the IMS network, it can be determined that the target wireless access network is capable of establishing the connection with the IMS network, which is easy to implement with high usability.

Figure 6:
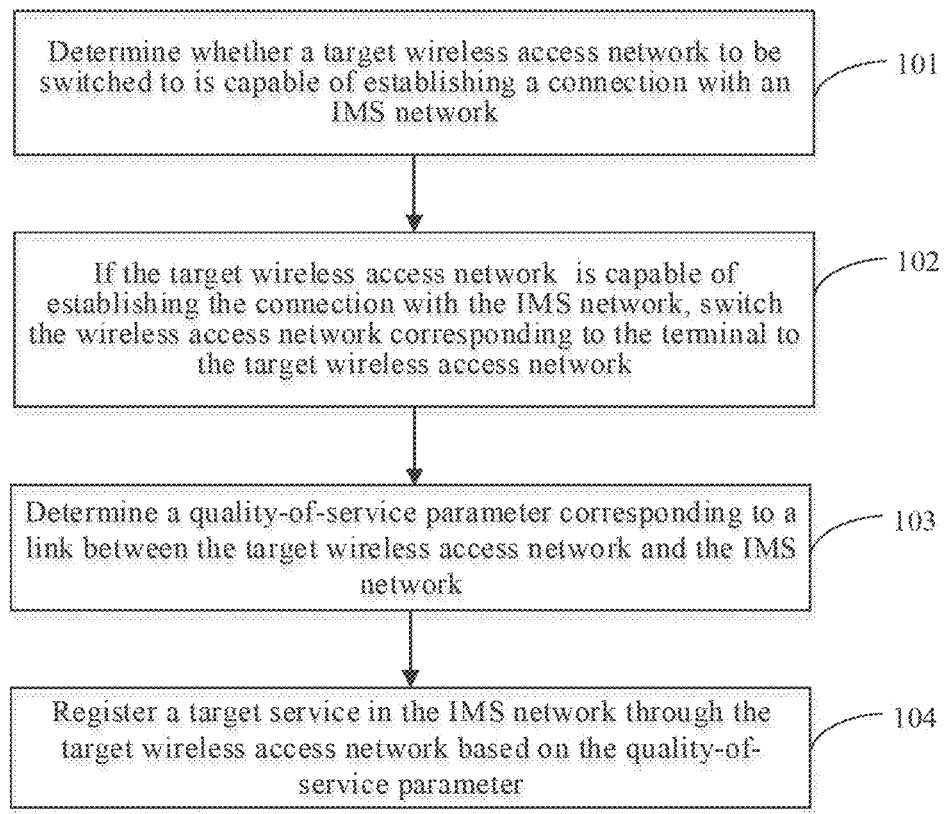
FIG. 6 is still another flowchart of another network switching method according to an exemplary embodiment of the present disclosure.

FIG. 6 illustrates another network switching method on the basis of the foregoing method shown in FIG. 2. As shown in FIG. 6, in an optional embodiment, the method may further include the following steps.

At step 103, a quality-of-service parameter corresponding to a link between the target wireless access network and the IMS network is determined. In an embodiment of the present disclosure, the quality-of-service parameter includes but is not limited to a time-delay parameter. The terminal may take a time period between when the test data packet is sent and when the response message returned through the target wireless access network by the IMS network is received as the time delay parameter.

At step 104, based on the quality-of-service parameter, a target service in the IMS network is registered through the target wireless access network. In an embodiment of the present disclosure, if the time-delay parameter meets a preset voice service condition corresponding to the IMS network, for example, is less than a first preset duration, then a voice call service in the IMS network may be registered after the terminal connects to the IMS network through the target access network. If the time-delay parameter meets a preset video service condition corresponding to the IMS network, for example, is less than a second preset duration (which is less than the first preset duration), then a video call service in the IMS network may be registered after the terminal connects to the IMS network through the target access network.

In the above embodiment, the terminal may also determine the quality-of-service parameter corresponding to the link between the target wireless access network and the IMS network, so as to register target services of the IMS network more precisely and more quickly based on the quality-of-service parameter.

Corresponding to the above method embodiments, the present disclosure also provides device embodiments.

Figure 7:
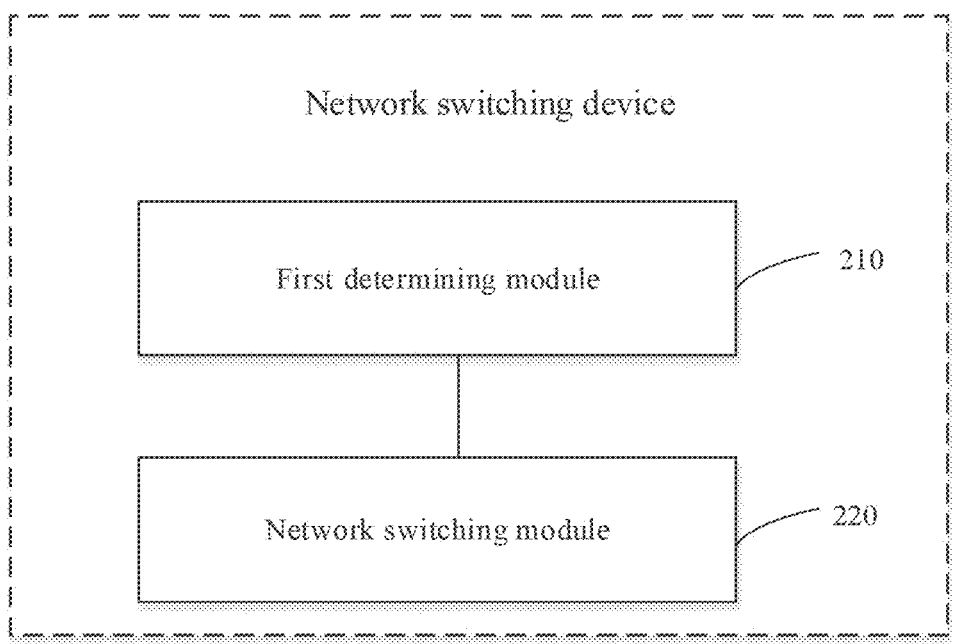
FIG. 7 is a block diagram of a network switching device according to an exemplary embodiment of the present disclosure.

FIG. 7 is a block diagram of a network switching device applicable to a terminal according to an exemplary embodiment of the present disclosure. As shown in FIG. 7, the device can include a first determining module 210 that is configured to determine whether a target wireless access network to be switched to is capable of establishing a connection with an IMS network, and a network switching module 220 that is configured to switch the wireless access network corresponding to the terminal to the target wireless access network if the target wireless access network is capable of establishing the connection with the IMS network.

Figure 8:
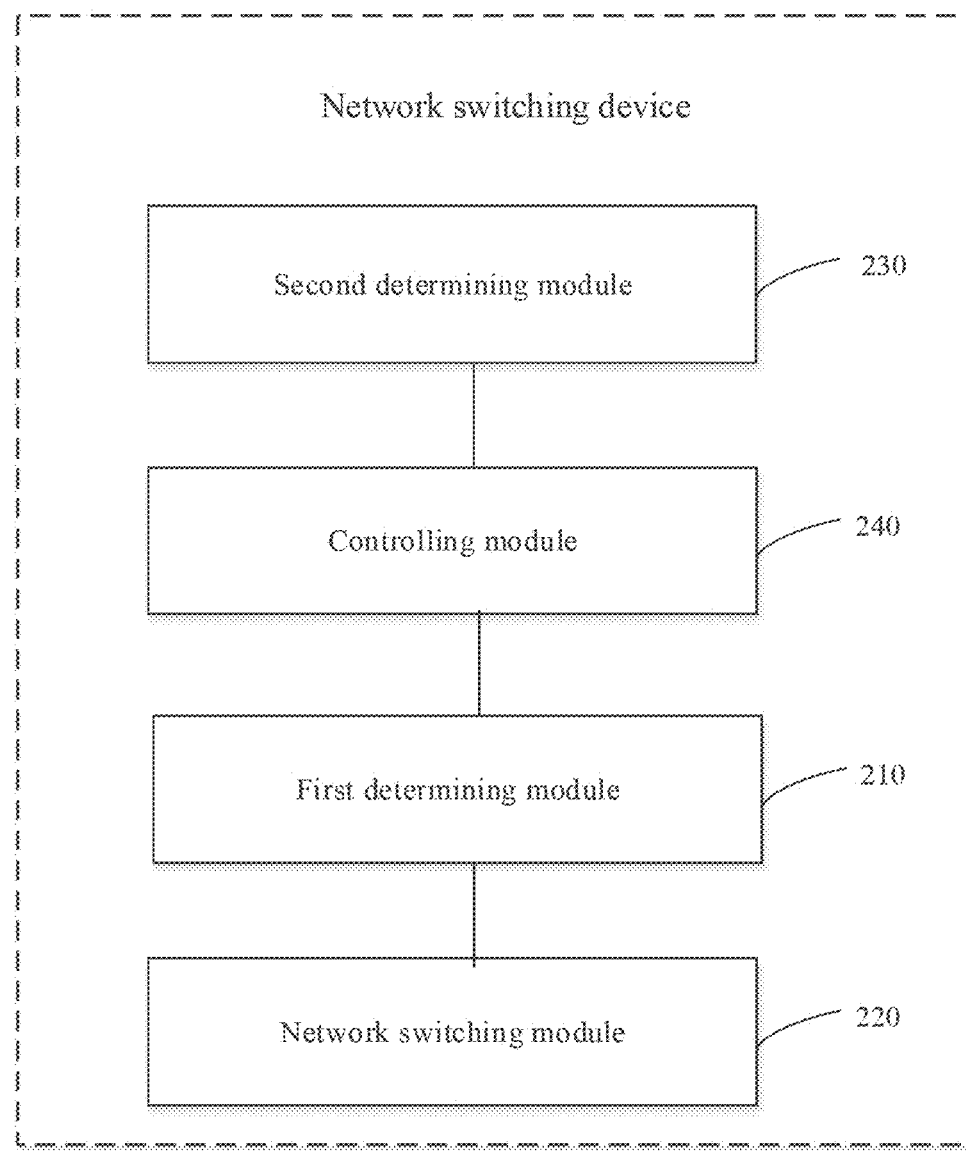
FIG. 8 is another block diagram of another network switching device according to an exemplary embodiment of the present disclosure.

FIG. 8 is another block diagram of a network switching device according to an exemplary embodiment of the present disclosure. As shown in FIG. 8, on the basis of the foregoing device shown in FIG. 7, the device further includes a second determining module 230 that is configured to determine whether a switching between wireless access networks is to be performed, and a controlling module 240 that is configured to control the first determining module 210 to, in response to determining that the switching between wireless access networks is to be performed, determine whether the target wireless access network to be switched to is capable of establishing the connection with the IMS network.

Figure 9:
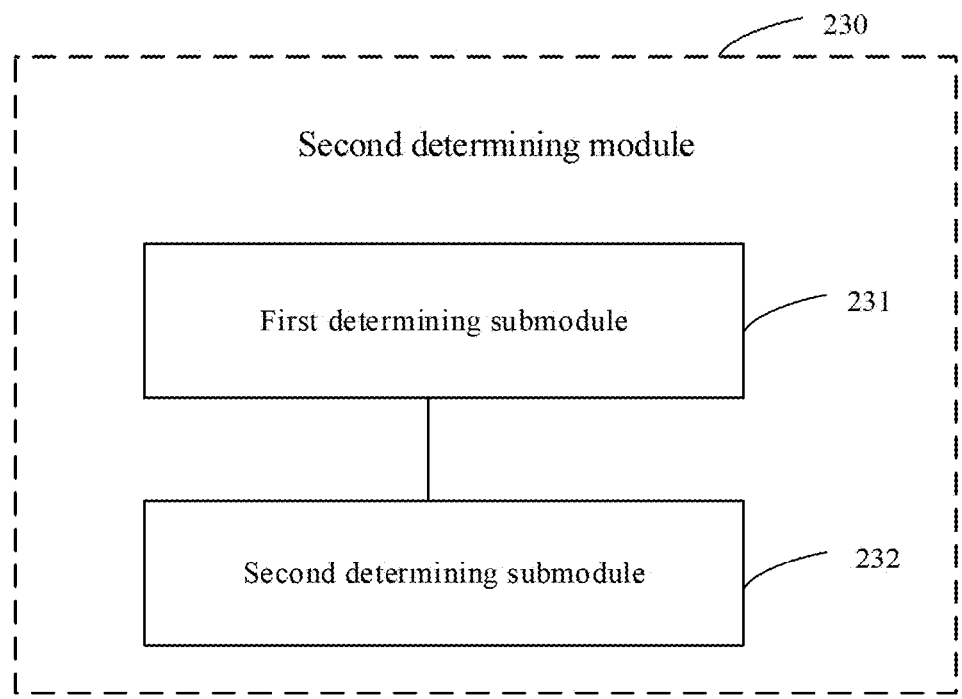
FIG. 9 is a block diagram of a second determining module according to an exemplary embodiment of the present disclosure.

FIG. 9 is a block diagram of another network switching device according to an exemplary embodiment of the present disclosure. As shown in FIG. 9, on the basis of the foregoing device shown in FIG. 8, the second determining module 230 can include a first determining submodule 231 that is configured to determine a wireless signal strength value of the target wireless access network, and a second determining submodule 232 that is configured to determine that the switching between wireless access networks is to be performed if the wireless signal strength value of the target wireless access network is greater than a preset threshold.

Figure 10:
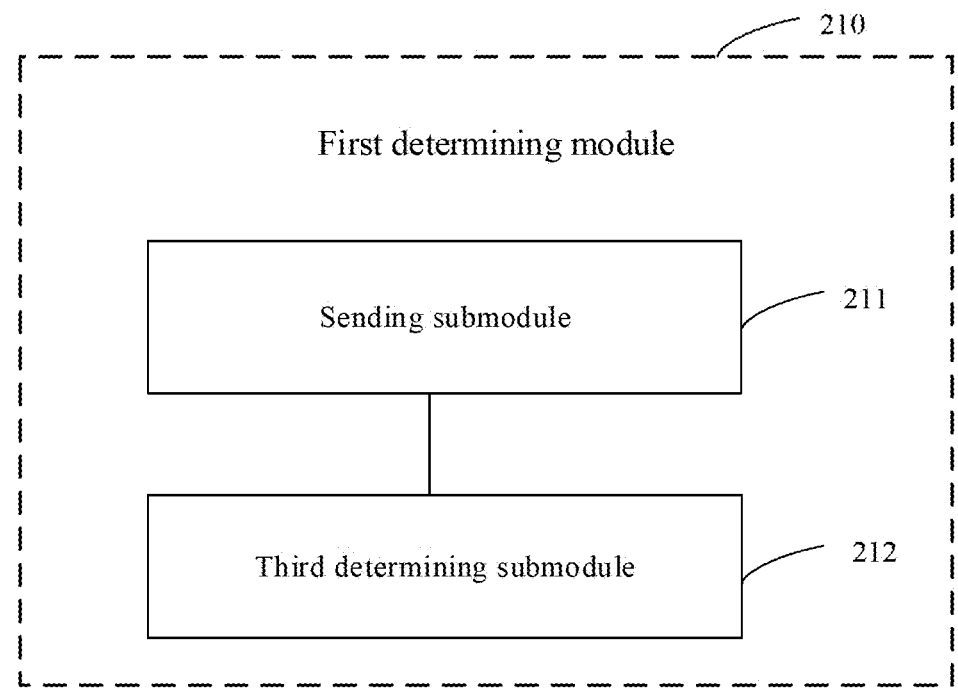
FIG. 10 is a block diagram of a first determining module according to an exemplary embodiment of the present disclosure.

FIG. 10 is a block diagram of another network switching device according to an exemplary embodiment of the present disclosure. As shown in FIG. 10, on the basis of the foregoing device shown in FIG. 7, the first determining module 210 can include a sending submodule 211 that is configured to send a test data packet from the target wireless access network to a server of the IMS network via a preset communication protocol, and a third determining submodule 212 that is configured to, in response to receiving a response message returned by the server of the IMS network for the test data packet, determine that the target wireless access network is capable of establishing the connection with the IMS network.

Figure 11:
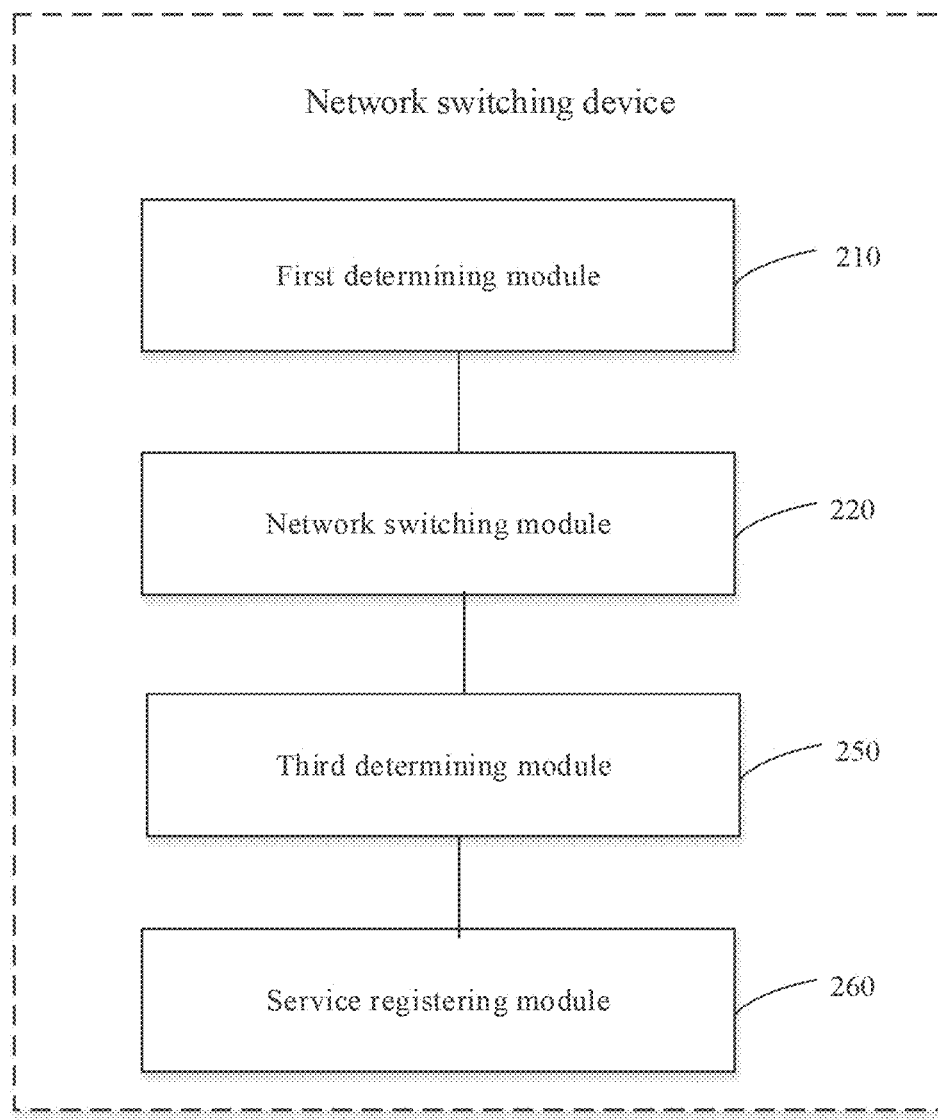
FIG. 11 is still another block diagram of another network switching device according to an exemplary embodiment of the present disclosure.

FIG. 11 is a block diagram of another network switching device according to an exemplary embodiment of the present disclosure. As shown in FIG. 11, on the basis of the foregoing device shown in FIG. 7, the device further can include a third determining module 250 that is configured to determine a quality-of-service parameter corresponding to the link between the target wireless access network and the IMS network, and a service registering module 260 that is configured to register, based on the quality-of-service parameter, a target service in the IMS network through the target wireless access network.

Figure 12:
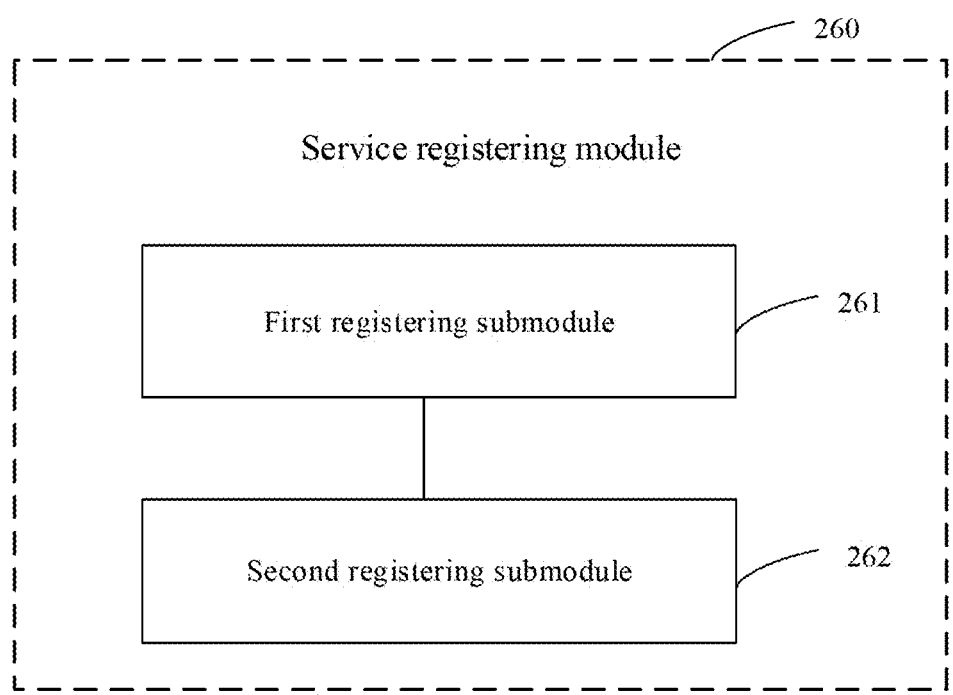
FIG. 12 is a block diagram of a service registering module according to an exemplary embodiment of the present disclosure.

FIG. 12 is a block diagram of another network switching device according to an exemplary embodiment of the present disclosure. As shown in FIG. 12, on the basis of the foregoing device shown in FIG. 11, the service registering module 260 can include a first registering submodule 261 that is configured to register, when the quality-of-service parameter meets a preset voice service condition, a voice call service in the IMS network through the target wireless access network, and a second registering submodule 262 that is configured to register, when the quality-of-service parameter meets a preset video service condition, a video call service in the IMS network through the target wireless access network.

Since the device embodiments essentially correspond to the method embodiments, reference may be made to the description of related parts of the method embodiments. The device embodiments described above are merely illustrative, wherein the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

The present disclosure can also provide a computer-readable storage medium storing a computer program, where the computer program is used for executing any of the network switching methods described above.

Further, the present disclosure can also provide a network switching device applicable to a terminal including a processor and a memory for storing instructions executable by the processor. The processor can be configured to determine whether a target wireless access network to be switched to is capable of establishing a connection with an IMS network, and switch, if the target wireless access network is capable of establishing the connection with the IMS network, the wireless access network corresponding to the terminal to the target wireless access network.

Figure 13:
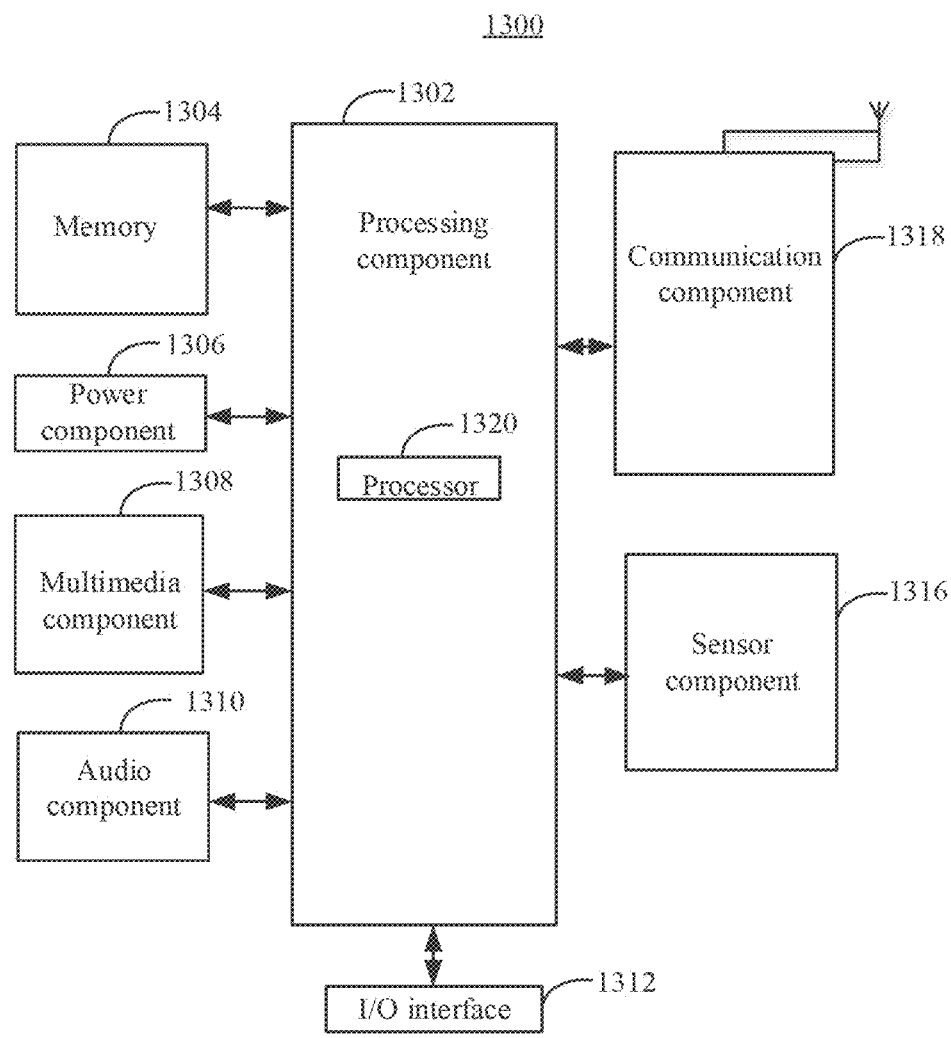
FIG. 13 is a structural diagram applicable to a network switching device according to an exemplary embodiment of the present disclosure.

FIG. 13 is a schematic block diagram of an electronic device 1300 according to an exemplary embodiment. The electronic device 1300 can be a terminal such as a mobile phone, a tablet computer, an e-book reader, a multimedia playback device, a wearable device, a vehicle-mounted terminal, and the like.

Referring to FIG. 13, the electronic device 1300 may include one or more of the following components: a processing component 1302, a memory 1304, a power component 1306, a multimedia component 1308, an audio component 1310, an input/output (I/O) interface 1312, a sensor component 1316, and a communication component 1318.

The processing component 1302 typically controls the overall operation of the electronic device 1300, such as operations associated with display, telephone calls, data communication, camera operations, and recording operations. The processing component 1302 can include one or more processors 1320 to execute instructions to perform all or part of the steps of the method described above. Moreover, the processing component 1302 can include one or more modules to facilitate interaction between the processing component 1302 and other components. For example, the processing component 1302 can include a multimedia module to facilitate interaction between the multimedia component 1308 and the processing component 1302. As another example, the processing component 1302 can read executable instructions from the memory 1304 to implement the steps of the network switching methods provided by the foregoing embodiments.

The memory 1304 is configured to store various types of data to support operation at the electronic device 1300. Examples of such data include instructions for any application or method operated on the electronic device 1300, contact data, phone book data, messages, pictures, videos, and the like. The memory 1304 can be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power component 1306 provides power to various components of the electronic device 1300. The power component 1306 can include a power management system, one or more power sources, and other components associated with generating, managing, and distributing power for the electronic device 1300.

The multimedia component 1308 includes a screen between the electronic device 1300 and the user that provides an output interface. In some embodiments, the multimedia component 1308 includes a front camera and/or a rear camera. When the electronic device 1300 is in an operation mode, such as a shooting mode or a video mode, the front camera and/or the rear camera can receive external multimedia data. Each front and rear camera can be a fixed optical lens system or have focal length and optical zoom capabilities.

The audio component 1310 is configured to output and/or input an audio signal. For example, the audio component 1310 includes a microphone (MIC) that is configured to receive an external audio signal when the electronic device 1300 is in an operation mode, such as a call mode, a recording mode, and a voice recognition mode. The received audio signal may be further stored in the memory 1304 or transmitted via the communication component 1318. In some embodiments, the audio component 1310 also includes a speaker for outputting an audio signal.

The I/O interface 1312 provides an interface between the processing component 1302 and the peripheral interface module, which may be a keyboard, a click wheel, a button, or the like. These buttons may include, but are not limited to, a home button, a volume button, a start button, and a lock button.

The sensor component 1316 includes one or more sensors for providing the electronic device 1300 with a status assessment of various aspects. For example, the sensor component 1316 can detect an open/closed state of the electronic device 1300, a relative positioning of components, such as the display and keypad of the electronic device 1300, and the sensor component 1316 can also detect a change in position of the electronic device 1300 or a component of the electronic device 1300, the presence or absence of user contact with the electronic device 1300, orientation or acceleration/deceleration of the electronic device 1300, and temperature change of the electronic device 1300. The sensor component 1316 can include a proximity sensor configured to detect the presence of nearby objects without any physical contact. The sensor component 1316 may also include a light sensor, such as a Complementary Metal-Oxide-Semiconductor (CMOS) or Charged Coupled Device (CCD) image sensor, for use in imaging applications. In some embodiments, the sensor component 1316 can also include an acceleration sensor, a gyro sensor, a magnetic sensor, a pressure sensor, or a temperature sensor.

The communication component 1318 is configured to facilitate wired or wireless communication between the electronic device 1300 and other devices. The electronic device 1300 can access a wireless network based on a communication standard, such as Wi-Fi, 2G, 3G, 4G, 5G, or a combination thereof. In an exemplary embodiment, the communication component 1318 receives broadcast signals or broadcast associated information from an external broadcast management system via a broadcast channel. In an exemplary embodiment, the communication component 1318 also includes a near field communication (NFC) module to facilitate short-range communication. For example, the NFC module can be implemented based on radio frequency identification (RFID) technology, infrared data association (IrDA) technology, ultra-wideband (UVB) technology, Bluetooth (BT) technology and other technologies.

In an exemplary embodiment, the electronic device 1300 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic components for performing the above methods.

In an exemplary embodiment, there is also provided a non-transitory machine readable storage medium comprising instructions, such as the memory 1304 comprising instructions executable by the processor 1320 of the electronic device 1300 to perform the above methods. For example, the non-transitory computer readable storage medium may be a ROM, a random access memory (RAM), a CD-ROM, a magnetic tape, a floppy disk, and an optical data storage device.

Figure 14:
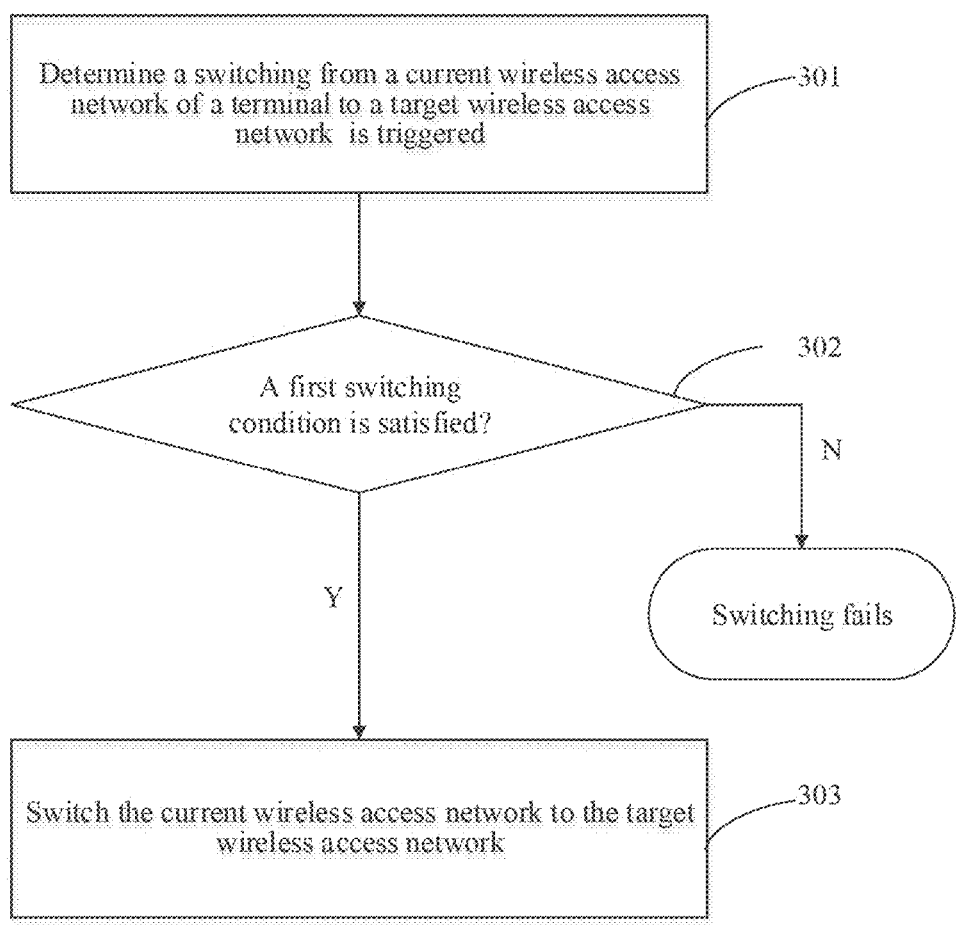
FIG. 14 is a flowchart of a network switching method according to an exemplary embodiment of the present disclosure.

Moreover, FIG. 14 illustrates a network switching method according to an exemplary embodiment of the present disclosure. As shown in FIG. 14, the network switching method includes the following steps.

At step 301, it is determined that a switching from a current wireless access network of a terminal to a target wireless access network is triggered.

At step 302, it is determined whether a first switching condition is satisfied. If the first switching condition is satisfied, it proceeds to step 303, and otherwise, the switching fails. Where, the first switching condition indicates that the target wireless access network is capable of establishing a connection with an IMS network.

At Step 303, the current wireless access network is switched to the target wireless access network.

Figure 15:
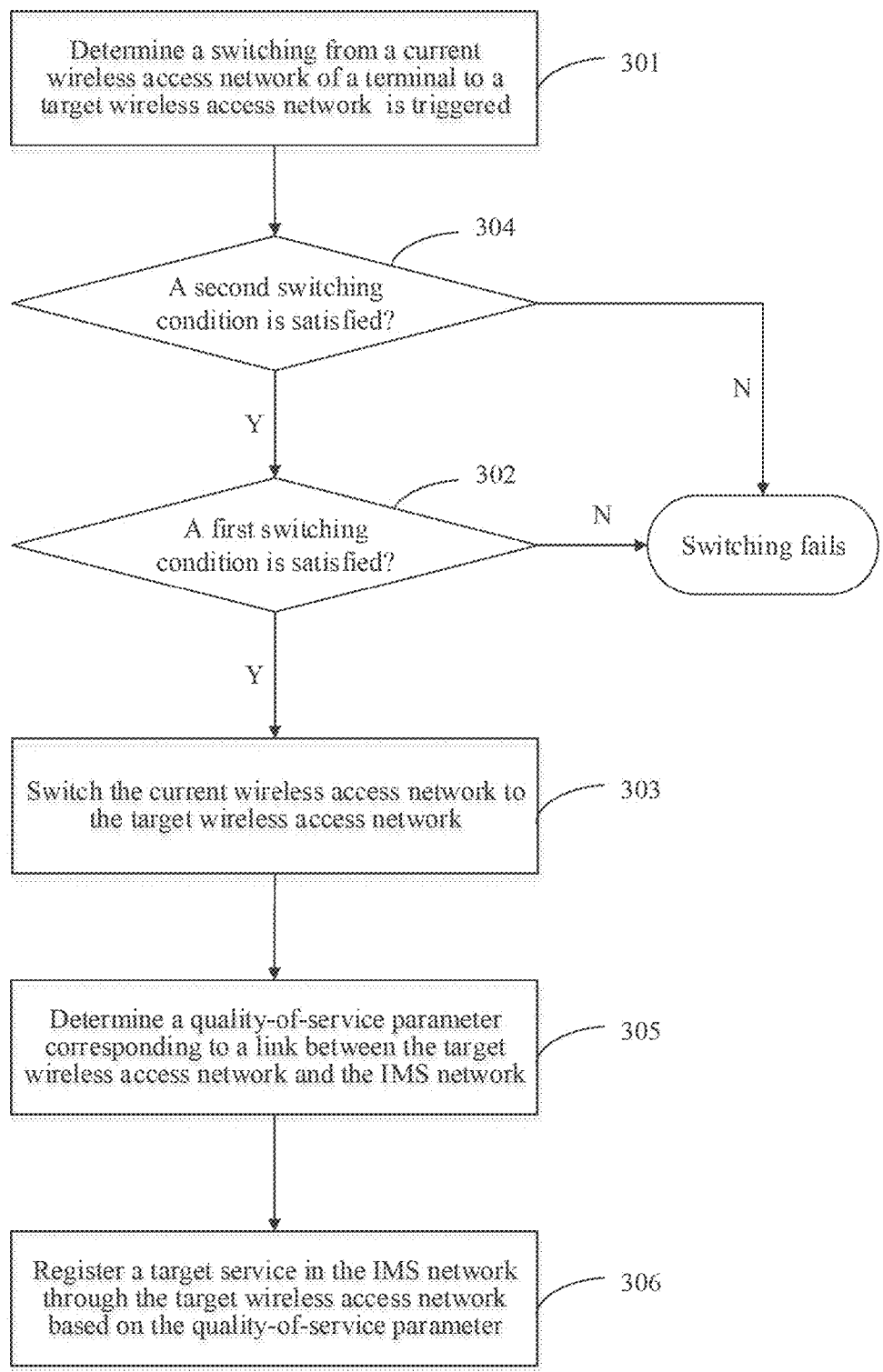
FIG. 15 is a flowchart of another network switching method according to an exemplary embodiment of the present disclosure.

Further, FIG. 15 illustrates another network switching method on the basis of the foregoing method shown in FIG. 14. As shown in FIG. 15, the network switching method includes the following steps.

At step 301, it is determined that a switching from a current wireless access network of a terminal to a target wireless access network is triggered. Where, if a first wireless signal strength value of the target wireless access network is greater than the second wireless signal strength value of the current wireless access network, it is to be determined that the switching from the current wireless access network to the target wireless access network is triggered.

At step 304, it is determined whether a second switching condition is satisfied. If the second switching condition is satisfied, it proceeds to step 302, and otherwise, the switching fails. Where, the second switching condition indicates that the first wireless signal strength value of the target wireless access network is greater than a preset threshold.

At step 302, it is determined whether a first switching condition is satisfied. If the first switching condition is satisfied, it proceeds to step 303, and otherwise, the switching fails.

At step 303, the current wireless access network is switched to the target wireless access network.

At step 305, a quality-of-service parameter corresponding to a link between the target wireless access network and the IMS network is determined.

At step 306, a target service in the IMS network through the target wireless access network is registered based on the quality-of-service parameter.

Other implementations of the present disclosure will be apparent to those skilled in the art from consideration of the specification and practice of the present disclosure herein. The present disclosure is intended to cover any variations, uses, or modification or adaptations of the present disclosure that follow the general principles thereof and include common knowledge or conventional technical means in the related art that are not disclosed herein. The specification and examples are to be considered as exemplary only, with a true scope and spirit of the present disclosure being indicated by the appended claims.

The above are only some embodiments of the present disclosure and are not intended to limit the present disclosure. Any modification, equivalent replacement, improvement, etc., which are made within the spirit and principles of the present disclosure, should be included within the scope of protection of the present disclosure.

The invention claimed is:

1. A network switching method that is applicable to a terminal, comprising:
    determining whether a target wireless access network to be switched to is capable of establishing a connection with an IP Multimedia Subsystem (IMS) network, including:
        sending a test data packet from the target wireless access network to a server of the IMS network via a preset communication protocol; and
        determining that the target wireless access network is capable of establishing the connection with the IMS network in response to receiving a response message returned by the server of the IMS network for the test data packet; and
    switching a wireless access network corresponding to the terminal to the target wireless access network when the target wireless access network is determined to be capable of establishing the connection with the IMS network.

2. The method of claim 1, further comprising:
    determining whether a switching between wireless access networks is to be performed; and
    proceeding to the step of determining whether the target wireless access network to be switched to is capable of establishing the connection with the IMS network in response to determining that the switching between wireless access networks is to be performed.

3. The method of claim 2, wherein determining whether the switching between wireless access networks is to be performed further comprises:

determining a wireless signal strength value of the target wireless access network; and determining that the switching between wireless access networks is to be performed when the wireless signal strength value of the target wireless access network is greater than a preset threshold.

4. The method of claim 1, further comprising:

determining a quality-of-service parameter corresponding to a link between the target wireless access network and the IMS network; and registering a target service in the IMS network through the target wireless access network based on the quality-of-service parameter.

5. The method of claim 4, wherein the quality-of-service parameter further includes a time-delay parameter.

6. The method of claim 4, wherein registering the target service in the IMS network through the target wireless access network based on the quality-of-service parameter further comprises:

when the quality-of-service parameter meets a preset voice service condition, registering a voice call service in the IMS network through the target wireless access network; and when the quality-of-service parameter meets a preset video service condition, registering a video call service in the IMS network through the target wireless access network.

7. A non-transitory computer-readable storage medium storing a computer program, wherein the computer program is used for executing the network switching method of claim 1.

8. A network switching device that is applicable to a terminal, comprising a processor and a storage medium on which instructions executable by the processor are stored, the processor being configured to:

determine whether a target wireless access network to be switched to is capable of establishing a connection with an IP Multimedia Subsystem (IMS) network by performing operations including:

sending a test data packet from the target wireless access network to a server of the IMS network via a preset communication protocol; and determining that the target wireless access network is capable of establishing the connection with the IMS network in response to receiving a response message returned by the server of the IMS network for the test data packet; and switch a wireless access network corresponding to the terminal to the target wireless access network when the target wireless access network is determined to be capable of establishing the connection with the IMS network.

9. The device of claim 8, wherein the processor is further configured to:

determine whether a switching between wireless access networks is to be performed; and determine whether the target wireless access network to be switched to is capable of establishing the connection with the IMS network in response to determining that the switching between wireless access networks is to be performed.

10. The device of claim 9, wherein when determining whether the switching between wireless access networks is to be performed, the processor is further configured to:

determine a wireless signal strength value of the target wireless access network; and determine that the switching between wireless access networks is to be performed if when the wireless signal strength value of the target wireless access network is greater than a preset threshold.

11. The device of claim 8, wherein the processor is further configured to:

determine a quality-of-service parameter corresponding to a link between the target wireless access network and the IMS network; and register a target service in the IMS network through the target wireless access network based on the quality-of-service parameter.

12. The device of claim 11, wherein when registering the target service in the IMS network through the target wireless access network based on the quality-of-service parameter, the processor is further configured to:

when the quality-of-service parameter meets a preset voice service condition, register a voice call service in the IMS network through the target wireless access network; and when the quality-of-service parameter meets a preset video service condition, registering a video call service in the IMS network through the target wireless access network.

13. A network switching method, comprising:

determining whether switching from a current wireless access network of a terminal to a target wireless access network is triggered; and in response to the switching is determined to be triggered, determining whether a first switching condition is satisfied, wherein the first switching condition indicates that the target wireless access network is capable of establishing a connection with an IP Multimedia Subsystem (IMS) network, the determining whether the first switching condition is satisfied includes:

sending a test data packet from the target wireless access network to a server of the IMS network via a preset communication protocol; and determining that the first switching condition, indicating that the target wireless access network is capable of establishing the connection with the IMS network, is satisfied in response to receiving a response message returned by the server of the IMS network for the test data packet, and switching the current wireless access network to the target wireless access network when the first switching condition is determined to be satisfied.

14. The method of claim 13, wherein determining the switching from the current wireless access network of the terminal to the target wireless access network is triggered further comprises:

determining a first wireless signal strength value of the target wireless access network and a second wireless signal strength value of the current wireless access network; and determining that the switching from the current wireless access network to the target wireless access network is triggered when the first wireless signal strength value is greater than the second wireless signal strength value.

15. The method of claim 13, further comprising:

determining whether a second switching condition is satisfied, wherein the second switching condition indicates that a first wireless signal strength value of the target wireless access network is greater than a preset threshold; and proceeding to the step of determining whether the first switching condition is satisfied when the second switching condition is determined to be satisfied.

16. The method of claim 13, further comprising:

determining a quality-of-service parameter corresponding to a link between the target wireless access network and the IMS network; and registering a target service in the IMS network through the target wireless access network based on the quality-of-service parameter.

17. The method of claim 16, wherein registering the target service in the IMS network through the target wireless access network based on the quality-of-service parameter comprises:

when the quality-of-service parameter meets a preset voice service condition, registering a voice call service in the IMS network through the target wireless access network; and when the quality-of-service parameter meets a preset video service condition, registering a video call service in the IMS network through the target wireless access network.

\* \* \* \* \*